Oct. 26, 1965
T. A. PREWITT
3,214,730
HEADLIGHT REMINDER CIRCUIT
Filed Sept. 25, 1962
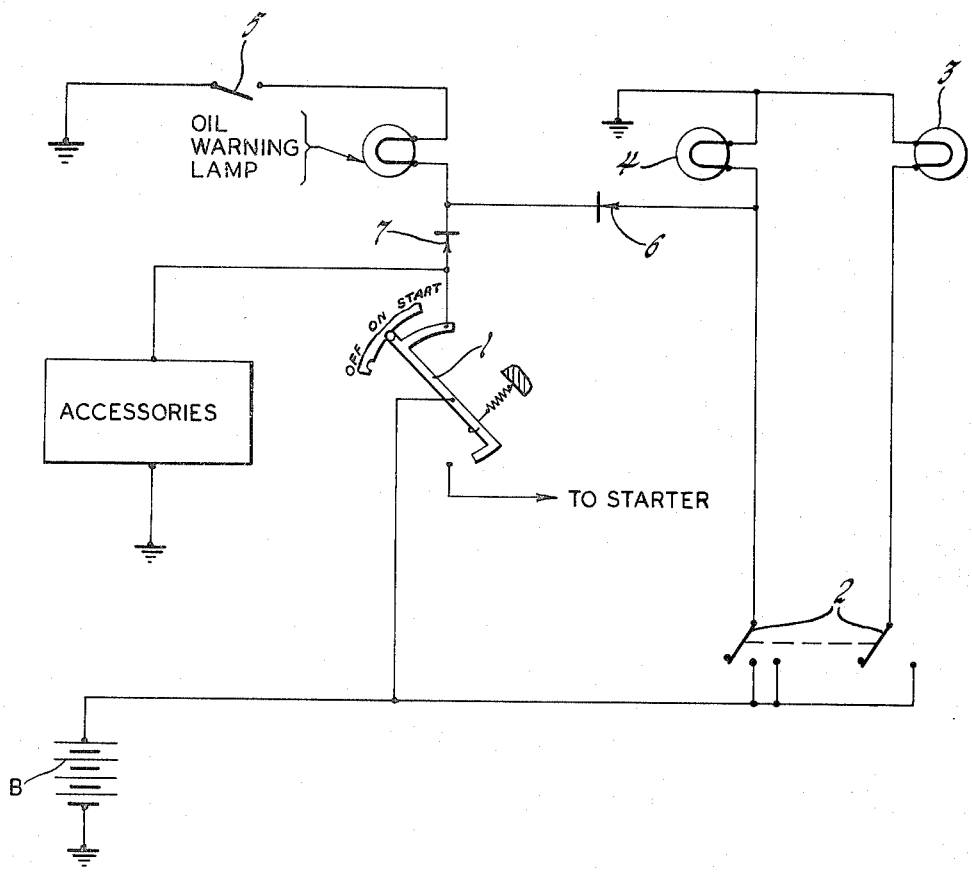
INVENTOR.
Thomas A. Prewitt
BY
Paul J. Ethington
ATTORNEY 3,214,730
HEADLIGHT REMINDER CIRCUIT
Thomas A. Prewitt, Kokomo, Ind., assignor to General Motors Corporation, Detroit, Mich., a corporation of Delaware
Filed Sept. 25, 1962, Ser. No. 226,006
4 Claims. (Cl. 340—52)

This invention relates to motor vehicle lighting systems and more particularly to an automobile headlight reminder circuit.

Motorists often park their automobiles and inadvertently leave the headlights burning. This produces a constant drain on the automobile battery frequently resulting in permanent damage thereto. There is, therefore, a need for a means of warning the driver after he has parked the automobile that the headlights are energized and should be turned off before he leaves the automobile.

The present invention provides a novel headlight reminder circuit employing an existing signaling means, such as the oil pressure warning lamp or the generator lamp, conventionally installed in present-day automobiles. The headlight reminder circuit is wired in such a manner that the signal lamp will be energized whenever two conditions coexist—namely the headlight switch is in either of its two "on" positions, and the engine of the automobile is off. A signaling means, such as the oil pressure warning lamp, is so connected in the lighting system as to be energized only when the oil pressure drops below a predetermined value. Such a condition exists when the automobile engine has been cut off. If, therefore, under this condition current is supplied through the headlight switch, this lamp may be effectively used to indicate that the headlights remain energized after the engine has stopped. This is accomplished in the present invention by connecting the headlight switch in series with the signaling device and in parallel with the ignition switch and by placing unidirectional conducting elements in the parallel circuits to prevent current feedback from one parallel circuit to the other.

Other advantages of the present invention will become apparent from the disclosure made in the following detailed description of the preferred embodiment of the invention taken in conjunction with the single figure of the drawings.

Referring to the drawing, there is shown an illustrative embodiment of the invention in the electrical system of an automotive vehicle. The reminder circuit comprises a source of electrical power, such as the vehicle battery B which supplies current through an ignition switch 1 to a plurality of electrically operated accessories and through a light switch 2 to the associated lighting equipment, such as a headlight 3 and a tail light 4. Current is supplied to the oil warning lamp through either the switch 1 or the switch 2. The oil warning lamp is connected to the other side of the source through the normally closed oil pressure responsive switch 5. Unidirectional conducting elements, such as diodes 6 and 7, are inserted in the circuit to prevent unwanted conduction to the lighting equipment and the electrically operated accessories, respectively.

The operation of that portion of the circuit which is associated with the vehicle engine oil pressure is conventional and is as follows. When the engine is not running, switch 5 is in its normal or closed position and actuation of the ignition switch will cause the oil warning lamp to light. When the ignition switch is moved to the start position, the engine will start and the oil pressure will come up to a predetermined value, at which time the switch 5 will open, de-energizing the oil warning lamp. Should the oil pressure drop below the predetermined value, the switch 5 will again close energizing the warning lamp through the ignition switch 1, indicating to the driver that the oil pressure is dangerously low.

The headlight reminder system utilizes the oil warning lamp in the following manner. Assuming that the motorist stops his vehicle with the headlights energized and turns off the ignition switch, thereby cutting off the car engine and causing switch 5 to return to its normally closed position, then the oil warning lamp will be energized through the light switch 2, the diode 6 and the switch 5 to indicate to the driver that the lights have been left on. As stated previously, the diode 7 prevents current from flowing through the light switch 2 to the electrically operated accessories, and the diode 6 prevents current from flowing from the ignition switch 1 to the lighting circuit.

Thus, the present invention provides a headlight reminder feature which requires no additional signaling means, thereby presenting a strong cost advantage. In addition, the present invention will prove quite effective since, through past experience, the driver has been conditioned to respond to the lighting of the oil pressure or generator warning lamp.

The embodiment of the invention as disclosed herein is for illustrative purposes only, and the scope of the invention is intended to be limited only by the following claims.

I claim:
1. A combination headlight and oil pressure reminder system for a motor vehicle, said system comprising a source of electrical power, a plurality of electrically operated accessories connected across said source through an ignition switch, load means comprising the vehicle headlights connected across said source through a headlight switch, a warning lamp connected across said source in series with said ignition switch and said headlight switch and in parallel with said headlights and said accessories, first and second unidirectional conducting elements connected respectively to said ignition switch and said headlight switch to prevent current flow through said ignition switch to said headlights and through said headlight switch to said accessories, a normally closed oil pressure responsive switch in series with said warning lamp to render said lamp inoperative when the oil pressure of said motor vehicle is above a predetermined value whereby said warning lamp is operative to indicate the existence of less than a predetermined oil pressure in the motor of said vehicle when the ignition switch is closed and is operative to indicate that the headlight switch is closed when the ignition switch is open.

2. A combination headlight and oil pressure reminder system for a motor vehicle, said system comprising a source of electrical power, a plurality of electrically operated accessories connected across said source through an ignition switch, load means comprising the vehicle headlights connected across said source through a headlight switch, a warning lamp, a first unidirectional conducting element connecting a junction between said headlight switch and said load directly to one side of said lamp, a second unidirectional conducting element connecting a junction between said ignition switch and said accessories directly to one side of said lamp, said elements being poled in a direction to prevent current flow through said headlamp switch to said accessories and through said ignition switch to said headlights, a normally closed engine oil pressure responsive switch being electrically connected between said source and the other side of said lamp whereby said lamp is operative to indicate the existence of less than a predetermined oil pressure when the vehicle engine is running and is operative to indicate that the headlight switch is closed when the vehicle engine is not running.

3. In a motor vehicle electrical system including a source of power, a first series circuit including an ignition switch, condition responsive switching means and indicating means for indicating the occurrence of said condition when said ignition switch is closed, a second series circuit including an external vehicle lamp load and a lamp load switch, the improvement comprising circuit means interconnecting said first and second series circuit, said circuit means allowing current flow between said source and said indicating means by way of said headlamp switch and preventing current flow between said source and said external lamp load by way of said ignition switch whereby said indicating means performs the additional function of indicating the concurrent closure of said external lamp load switch and said condition responsive switching means.

4. A motor vehicle warning system comprising a source of power, a combination engine condition warning and headlamp reminder signaling device connected across said source through an ignition switch and an engine condition responsive switch, a headlight switch connected in series with a load comprising the vehicle headlights, a unidirectional conducting element connected in series with said headlight switch and said signaling device, said element being poled in a direction to prevent current flow between said source and said headlights by way of said ignition switch and to allow current flow from said source through said signaling device by way of said headlight switch whereby said signaling device is operative to indicate an abnormal engine condition when the engine is running and is operative to indicate the energization of the vehicle headlights when the engine is not running.

References Cited by the Examiner
UNITED STATES PATENTS

| | | | |
|---|---|---|---|
| 2,799,843 | 7/57 | Savino | 340—52 |
| 3,077,576 | 2/63 | Hughes | 340—52 |

NEIL C. READ, *Primary Examiner.*